United States Patent [19]
Reinsma et al.

[11] 3,989,314
[45] Nov. 2, 1976

[54] WHEEL OF TRACK ASSEMBLY OF A CRAWLER TYPE VEHICLE

[75] Inventors: Harold L. Reinsma, Dunlap; Robert D. McFeeters, Washington; Terry D. Linne, Peoria, all of Ill.

[73] Assignee: Caterpillar Tractor Co., Peoria, Ill.

[22] Filed: Nov. 24, 1975

[21] Appl. No.: 634,564

[52] U.S. Cl. .................. 305/28; 74/230.7; 152/307; 152/323
[51] Int. Cl.² .......................... B62D 55/14
[58] Field of Search .......... 305/21, 24, 27, 28; 301/97, 98; 152/323, 301, 306–309, 7, 185; 74/230.7, 230.3

[56] References Cited
UNITED STATES PATENTS

| 146,615 | 1/1974 | Sanford | 74/230.7 |
| 652,099 | 6/1900 | Gerhardt | 152/307 |
| 2,970,867 | 2/1961 | Ruf | 305/24 X |
| 3,318,165 | 5/1967 | McAleer et al. | 74/230.7 |
| 3,603,650 | 9/1971 | Miller | 305/28 X |

*Primary Examiner*—Robert B. Reeves
*Assistant Examiner*—John P. Shannon
*Attorney, Agent, or Firm*—Frank L. Hart

[57] ABSTRACT

A wheel of a track assembly of a crawler type vehicle has a resilient contacting element fixed about the wheel rim by first and second anchors. The anchors are slidably movable along angular end portions of a rim opening for securing the contacting element to the rim.

10 Claims, 6 Drawing Figures

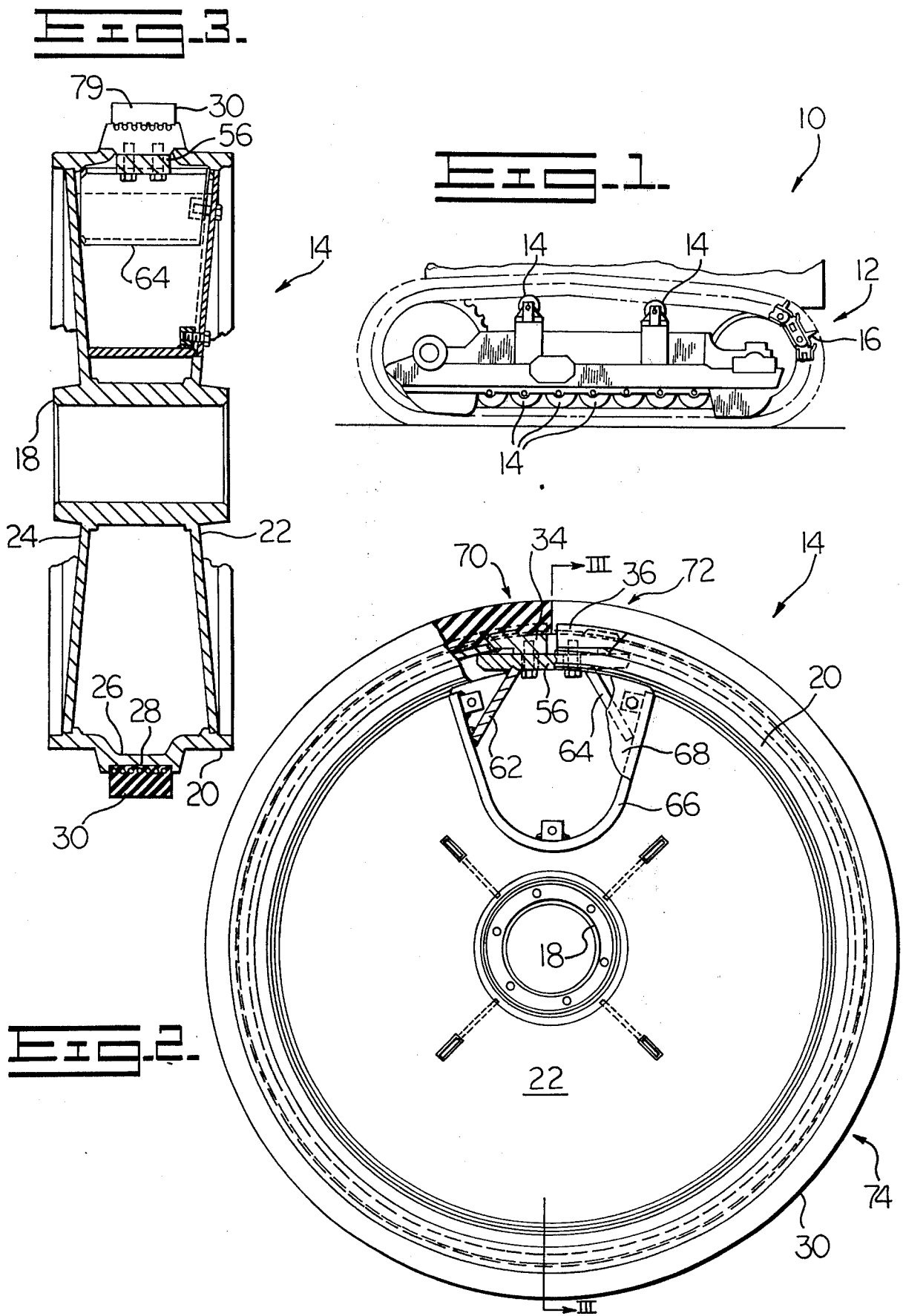

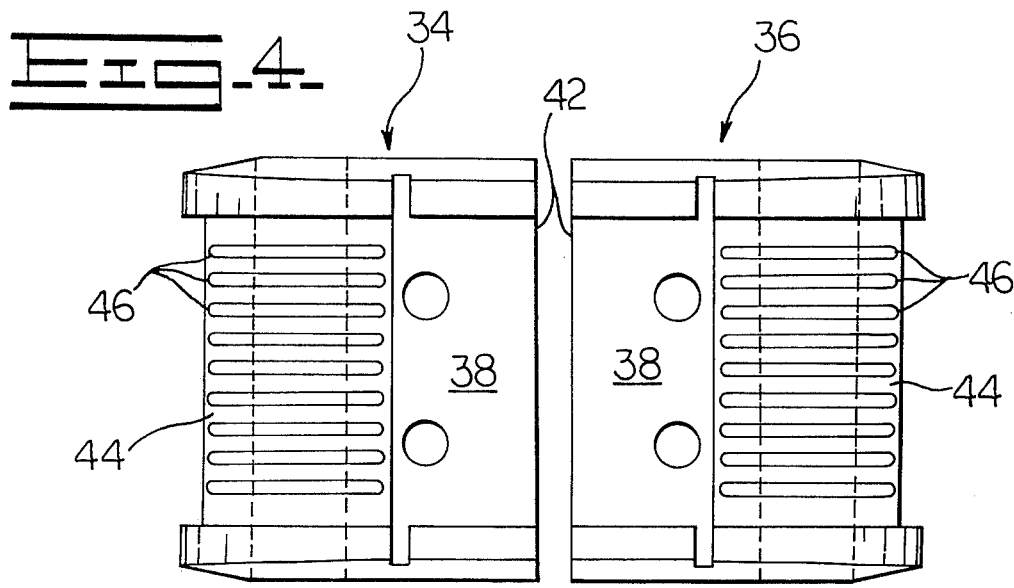
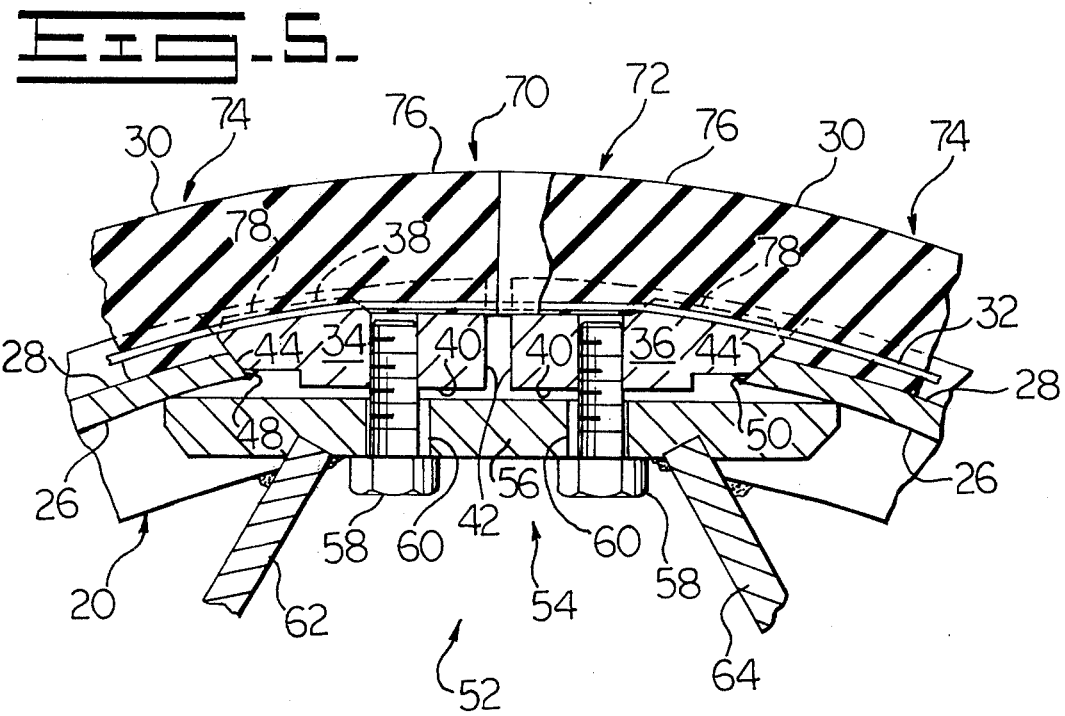
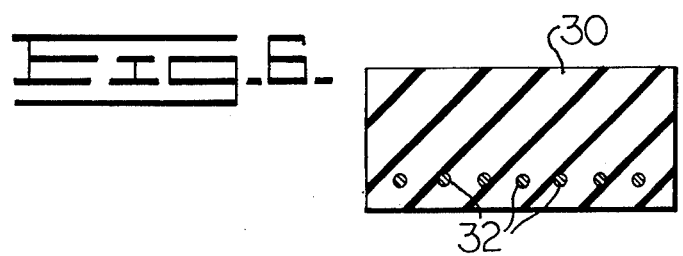

WHEEL OF TRACK ASSEMBLY OF A CRAWLER TYPE VEHICLE

BACKGROUND OF THE INVENTION

Track assemblies of crawler type vehicles have a plurality of wheels contacting and supporting the track. During operation of the vehicle the track impacts upon the wheels and produces undesirable noise.

This invention resides in apparatus for securing a resilient contacting element about the wheel for reducing the noise emitted during operation of the vehicle. This apparatus is of a construction sufficient to withstand the sometimes extreme forces that may be exerted on the contacting element.

BRIEF DESCRIPTION OF THE DRAWINGS

FIG. 1 is a diagrammatic view of a portion of a crawler type vehicle having the wheels of this invention;

FIG. 2 is a diagrammatic side view of the wheel of this invention;

FIG. 3 is a diagrammatic sectional view of the wheel of FIG. 2;

FIG. 4 is a diagrammatic plan view of the anchors;

FIG. 5 is a diagrammatic side view of the anchors, resilient contacting element, anchor plate, and rim; and FIG. 6 is a diagrammatic sectional view of a middle portion of the resilient contacting element.

DETAILED DESCRIPTION OF THE INVENTION

Referring to FIG. 1, a crawler type vehicle 10 has a track assembly 12 which has wheels 14, for example idler wheels, which support a flexible track 16, as is known in the art.

Referring to FIGS. 2 and 3, the wheels 14 are generally formed of metal and have a hub 18 connected to a rim 20 by first and second panels 22, 24. The rim 20 has inner and outer surfaces 26, 28 (FIG. 3).

An elongated, resilient contacting element 30 circumferentially extends substantially completely about the outer surface 28 of the rim 20. A plurality of reinforcing elements 32, better seen in FIG. 6, extend longitudinally through the contacting element 30 and are fixedly connected thereto.

Referring to FIGS. 4 and 5, first and second anchors are connected to opposed ends of the contacting element 30. Each anchor 34, 36 has first and second surfaces 38, 40 and inner and outer ends 42, 44.

The first surface 38 of each anchor 34, 36 has a plurality of grooves 46 for receiving and connecting respective ends of the reinforcing elements 32 thereto. At least one of the anchors, preferably both anchors 34, 36, have outer ends 44 that are of angular configuration. As shown, the outer ends 44 passing from the first toward the second surface 38, 40 are directed toward the respective inner end 42 of the anchor in the installed position of the anchors. The angular outer ends 44 of the anchors 34, 36 are mateable with angular end portions 48, 50 of an opening 52 extending through the rim 20.

During installation of the resilient contacting element 30 on the wheel 14, the outer ends 44 of one or both anchors 34, 36 slidably move along the angular end portions 48, 50 of the rim opening 52 in a direction toward the adjacent anchor and into said opening 52 in response to urging one or both of the anchors toward the hub 18.

Where only one of the anchors, 34 for example, has an angular outer end 44, the other anchor 36 and associated opening end portion 50 can be parallel to the vertical or of other configurations. In such a construction, anchor 36 will be first fixedly connected by a bolt or by welding to the rim 20 and anchor 34 will thereafter be slidably moved for forcibly securing the contacting element 30 to the rim 20.

Means 54 are provided for urging one or both anchors 34, 36 toward the hub 18 and connecting the contacting element 30 about the outer surface 28 of the rim 20. In a preferred embodiment, an anchor plate 56 extends across the rim opening 52 and is in contact with the inner surface 26 of the rim 20 on opposed sides of said opening 52. At least two threaded members 58, preferably a plurality of threaded members, extend through openings 60 of the anchor plate 56 and into threaded engagement with a respective anchor 34, 36. The openings 60 are also sufficiently oversized relative to the diameter of the associated member 58 to provide for the movement of the anchors 34, 36 and associated ends of the contacting element 30 toward one another during movement of the anchors into the rim opening 52.

The anchor plate 56 is preferably fixedly connected to the wheel 14. An effective connection for the anchor plate 56 to the wheel 14 is through first and second support members 62, 64 each connected at one end to the anchor plate 56 and at the other end to the panels 22, 24, as shown in FIG. 2.

An access opening 66, with or without a cover 68, is formed through one of the panels 22 for manipulation of the threaded members 58.

The reinforcing elements 32 can be connected to the anchors by various means such as deforming and moving sidewalls of the groove 46 into forcible engagement with the reinforcing elements 32 or by adhesive bonding, brazing or welding, among others.

Referring to FIGS. 2, 5, and 6, the resilient contacting element 30 has first and second end portions 70, 72 and a middle portion 74. The reinforcing elements 32, for example steel wires or others, are encompassed by resilient material 79 of the contacting element 30, for example rubber, at the middle portion 74, see FIG. 6, and are free from connection to the resilient material 79 at the first and second end portions 70, 72 (FIG. 5).

Preferably the first and second end portions 70, 72 of the contacting element 30 each have flanges 76 mateable with ledges 78 of the anchors 34, 36 with the anchor grooves 46 being formed through said ledges 78. This construction provides additional support for the ends of the contacting element 30.

By so constructing the contacting element 30, said element can be forcibly brought into engagement with the outer surface 28 of the rim 20 by rotating threaded members 58 which causes the anchors 34, 36 to move toward one another and into the opening 52. The construction is rugged yet can be easily and quickly installed on the rim without removing the track or the mounted wheel.

Other aspects, objects, and advantages of this invention can be obtained from a study of the drawings, the disclosure, and the appended claims.

What is claimed is:

1. In an improved wheel of a track assembly of a crawler type vehicle, said wheel having a hub, a rim having inner and outer surfaces, and panels connecting the hub to the rim, the improvement comprising:

an elongated, resilient contacting element having a plurality of reinforcing elements fixedly connected thereto, said contacting element being of a size sufficient for circumferentially extending substantially completely about the outer surface of the rim;

first and second anchors each having a first surface and outer ends, said first surface having a plurality of grooves receiving and connecting a respective end of the reinforcing elements to the anchors and said outer end of at least one of the anchors being of an angular configuration mateable with a respective angular end portion of an opening through the rim, said angular end being oriented for slidable movement of said anchor along the angular end portion of the rim opening in a direction toward the other anchor and into said opening in response to urging the anchor toward the hub; and means for urging the anchor toward the hub and connecting the contacting element about the outer surface of the rim.

2. Apparatus, as set forth in claim 1, wherein each anchor has an outer end of angular configuration mateable with angular end portions of the opening.

3. Apparatus, as set forth in claim 2, wherein the urging means comprises:

an anchor plate extending across the rim opening and in contact with the inner surface of the rim; and at least two threaded members each extending through the anchor plate and into threaded engagement with a respective anchor.

4. Apparatus, as set forth in claim 3, wherein the anchor plate is fixedly connected to the wheel.

5. Apparatus, as set forth in claim 4, including first and second support members each connected to the anchor plate and the panels.

6. Apparatus, as set forth in claim 1, including an access opening through one of the panels adjacent the opening of the rim.

7. Apparatus, as set forth in claim 1, wherein the reinforcing elements are fixed within the grooves by moving sidewalls of the grooves into forcible engagement with the reinforcing elements.

8. Apparatus, as set forth in claim 1, wherein the urging means comprises:

an anchor plate extending across the rim opening and in contact with the second surface of the rim;

means for fixing one of the anchors to the anchor plate; and a threaded member extending through the anchor plate and into threaded engagement with the other anchor.

9. Apparatus, as set forth in claim 1, wherein the resilient contacting element has first and second end portions and a middle portion and wherein the reinforcing elements are encompassed by resilient material at the middle portion of the contacting element and are free from connection to the resilient material at the first and second end portions.

10. Apparatus, as set forth in claim 9, wherein the first and second end portions of the contacting element have flanges mateable with ledges of the anchors and wherein the anchor ledges have the grooves formed therein.

* * * * *